M. B. RYAN.
CHAIN WELDING MACHINE.
APPLICATION FILED DEC. 27, 1907. RENEWED SEPT. 8, 1911.

1,023,129.

Patented Apr. 16, 1912.
10 SHEETS—SHEET 1.

M. B. RYAN.
CHAIN WELDING MACHINE.
APPLICATION FILED DEC. 27, 1907. RENEWED SEPT. 8, 1911.

1,023,129.

Patented Apr. 16, 1912.
10 SHEETS—SHEET 4.

M. B. RYAN.
CHAIN WELDING MACHINE.
APPLICATION FILED DEC. 27, 1907. RENEWED SEPT. 8, 1911.

1,023,129.

Patented Apr. 16, 1912.

10 SHEETS—SHEET 6.

Witnesses:
Max B. A. Doring
A. Navornt

Inventor
Michael B. Ryan,
By his Attorney
Edwin J. Prindle

M. B. RYAN.
CHAIN WELDING MACHINE.
APPLICATION FILED DEC. 27, 1907. RENEWED SEPT. 8, 1911.

1,023,129.

Patented Apr. 16, 1912.

10 SHEETS—SHEET 7.

M. B. RYAN.
CHAIN WELDING MACHINE.
APPLICATION FILED DEC. 27, 1907. RENEWED SEPT. 8, 1911.

1,023,129.

Patented Apr. 16, 1912.
10 SHEETS—SHEET 9.

Witnesses:
Max B. A. Doring
A. Newcomt

Inventor
Michael B. Ryan,
By his Attorney
Edwin J. Prindle.

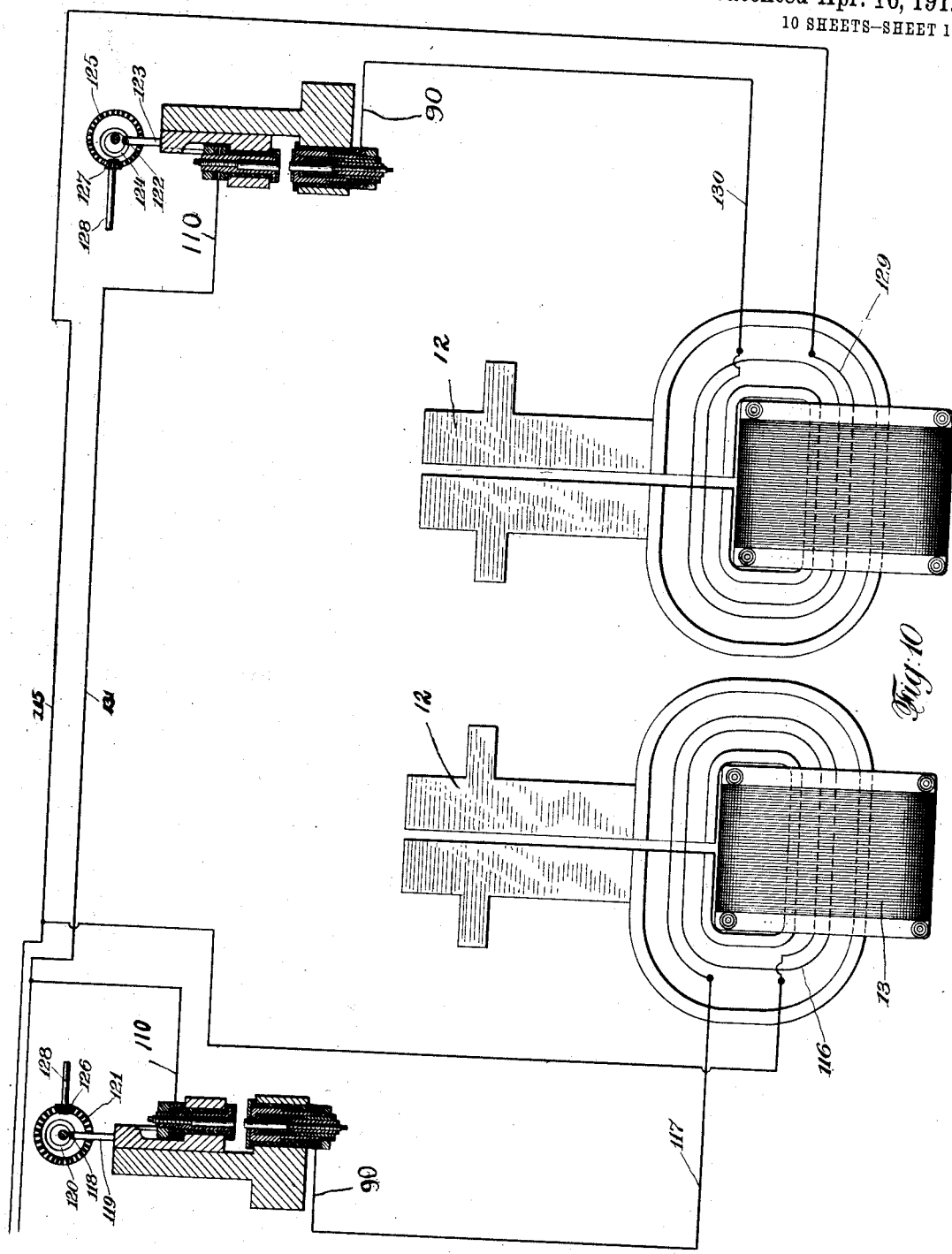

UNITED STATES PATENT OFFICE.

MICHAEL B. RYAN, OF BOSTON, MASSACHUSETTS, ASSIGNOR TO McKINNON CHAIN COMPANY, A CORPORATION OF NEW YORK.

CHAIN-WELDING MACHINE.

1,023,129. Specification of Letters Patent. Patented Apr. 16, 1912.

Application filed December 27, 1907, Serial No. 408,281. Renewed September 8, 1911. Serial No. 648,397.

*To all whom it may concern:*

Be it known that I, MICHAEL B. RYAN, of Boston, in the county of Suffolk and in the State of Massachusetts, have invented a certain new and useful Improvement in a Chain-Welding Machine, and do hereby declare that the following is a full, clear, and exact description thereof, reference being had to the accompanying drawings, in which—

Figure 1:
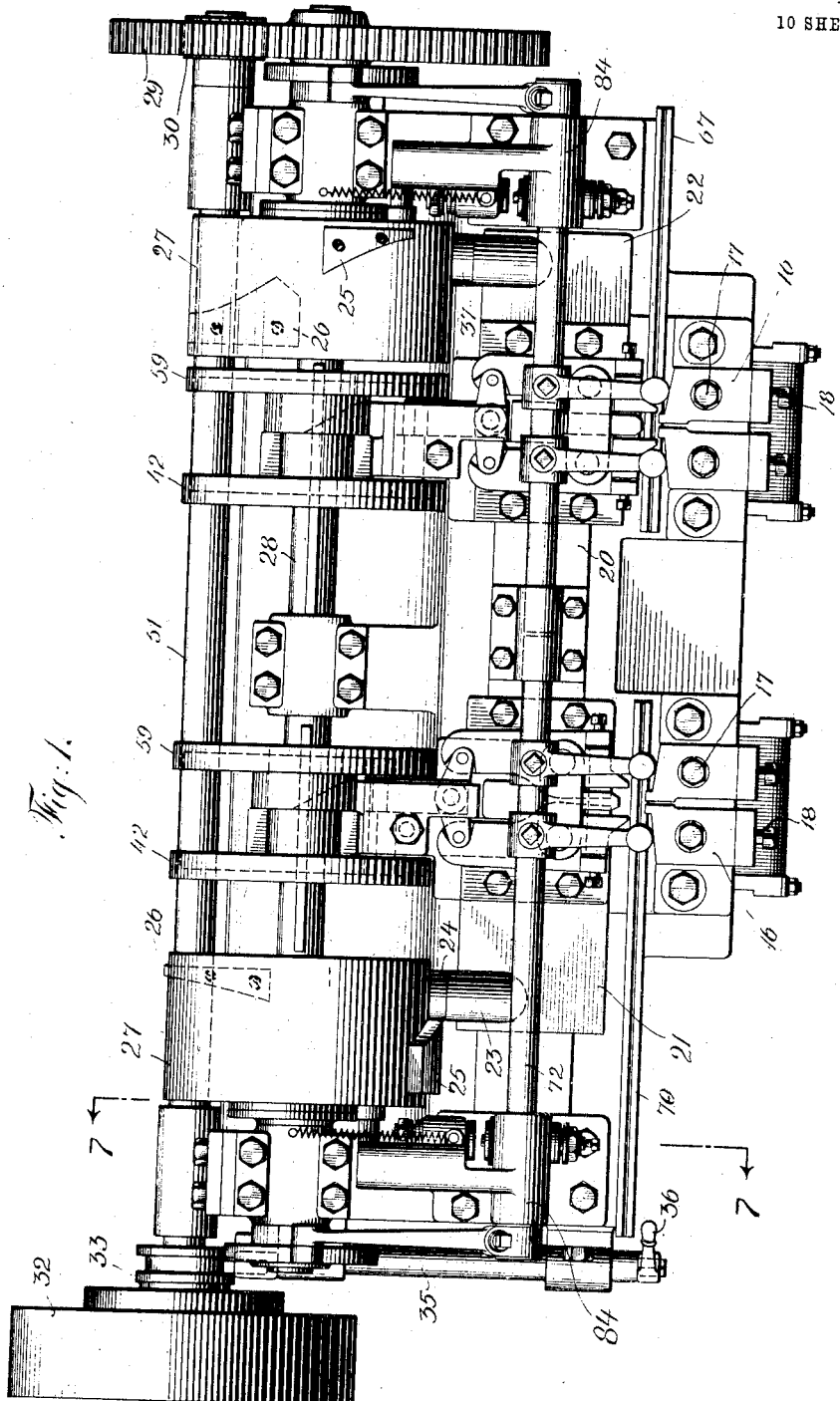
Figure 2:
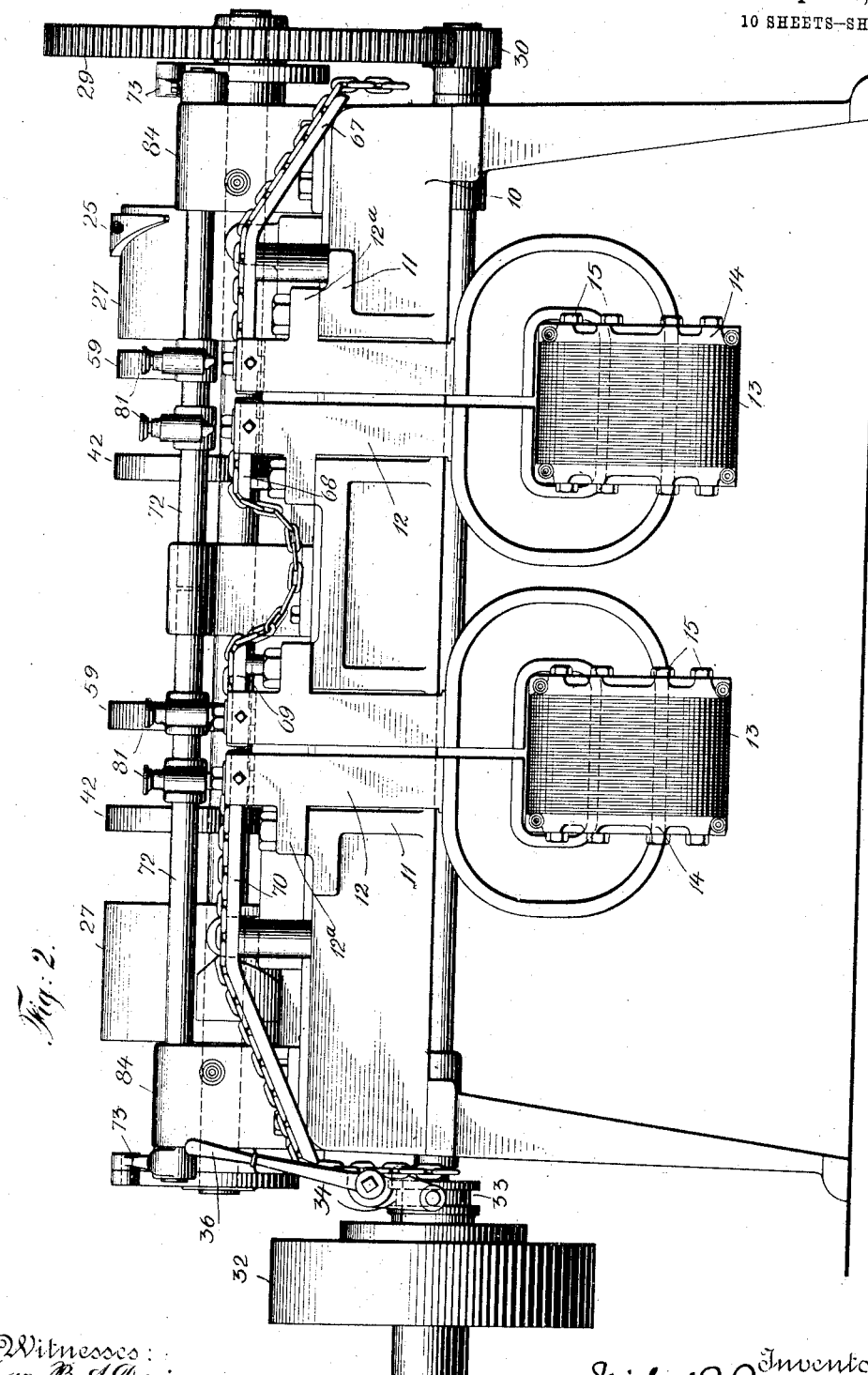
Figure 3:
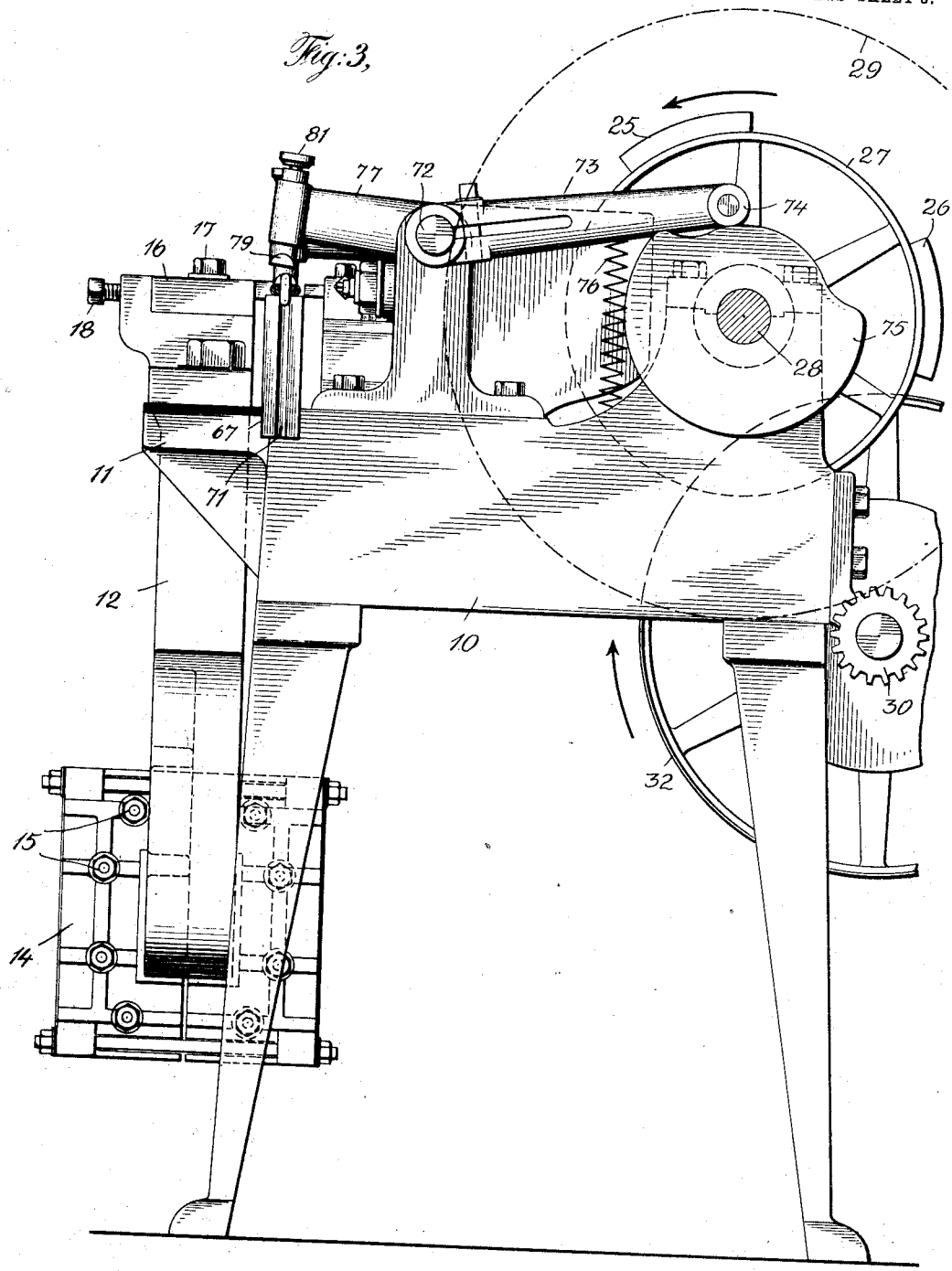
Figure 4:
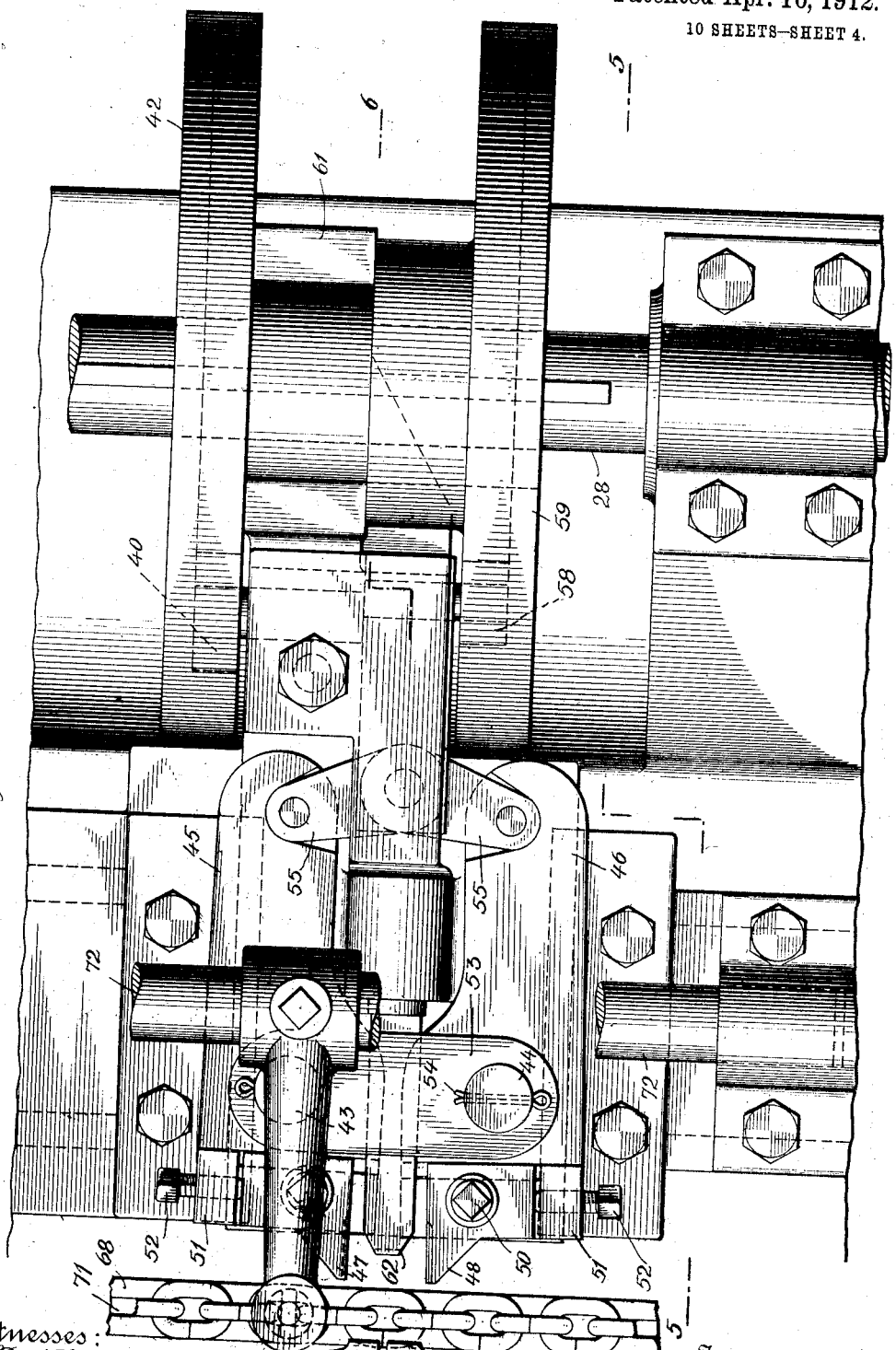
Figure 5:
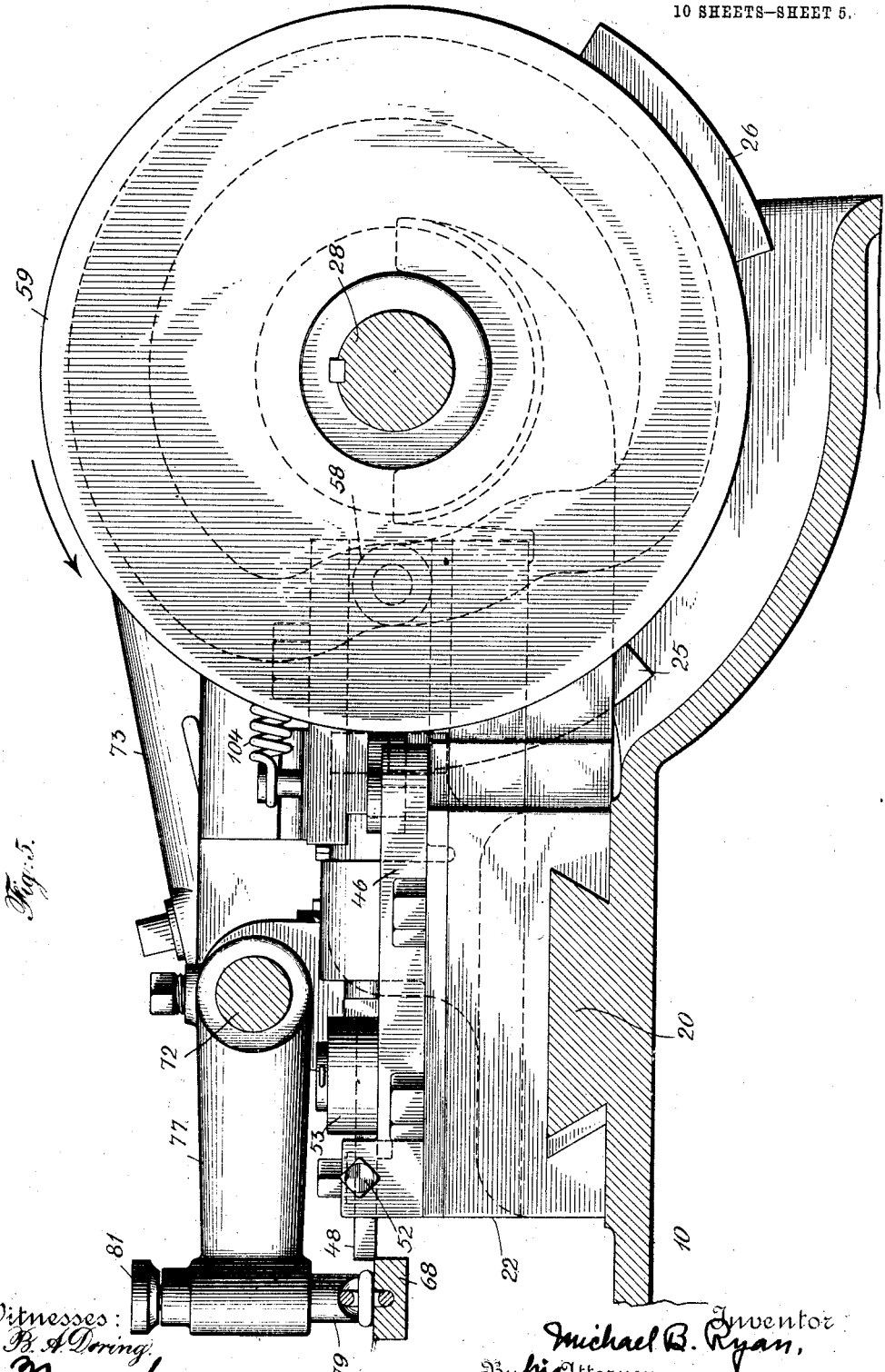
Figure 6:
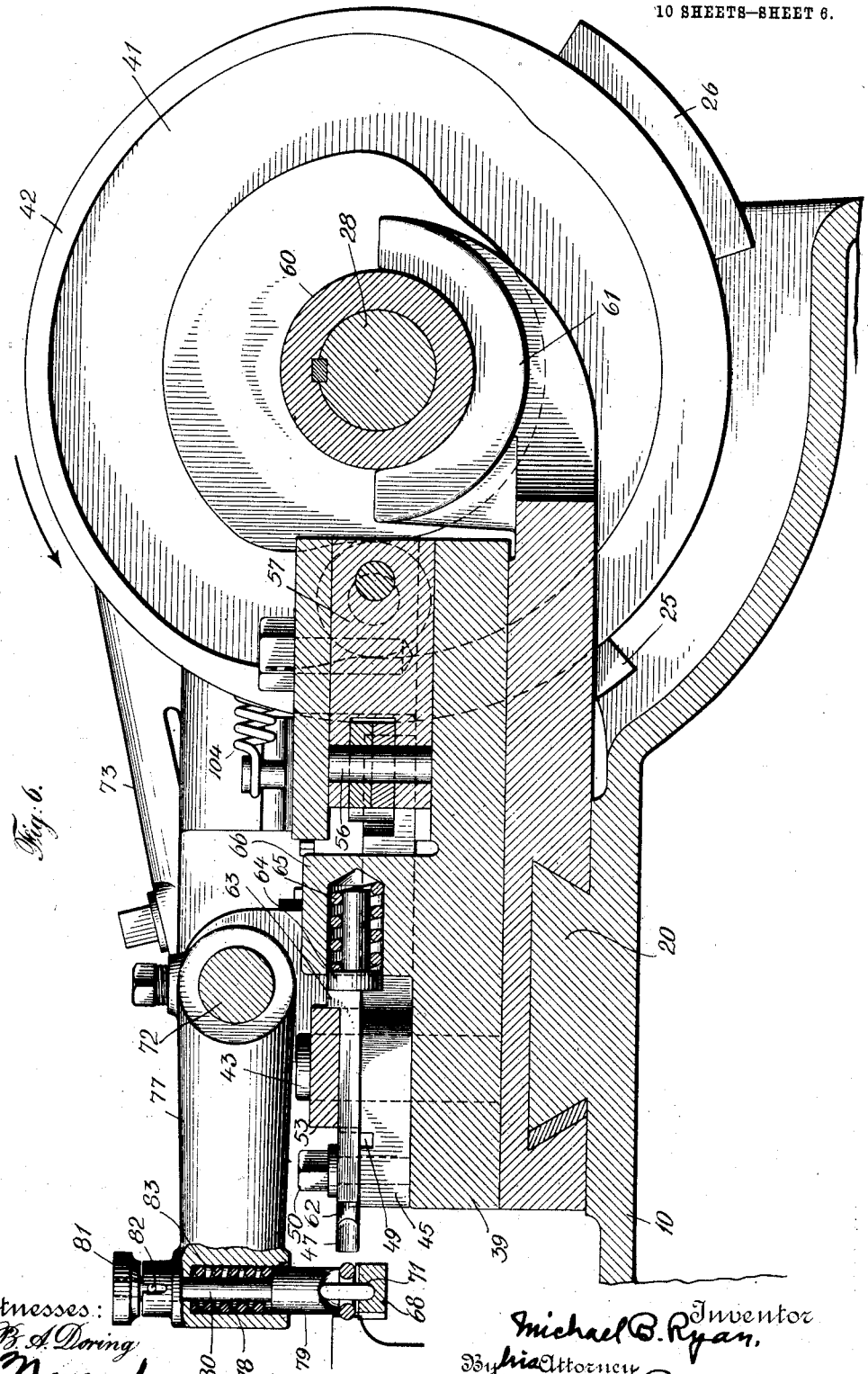
Figure 7:
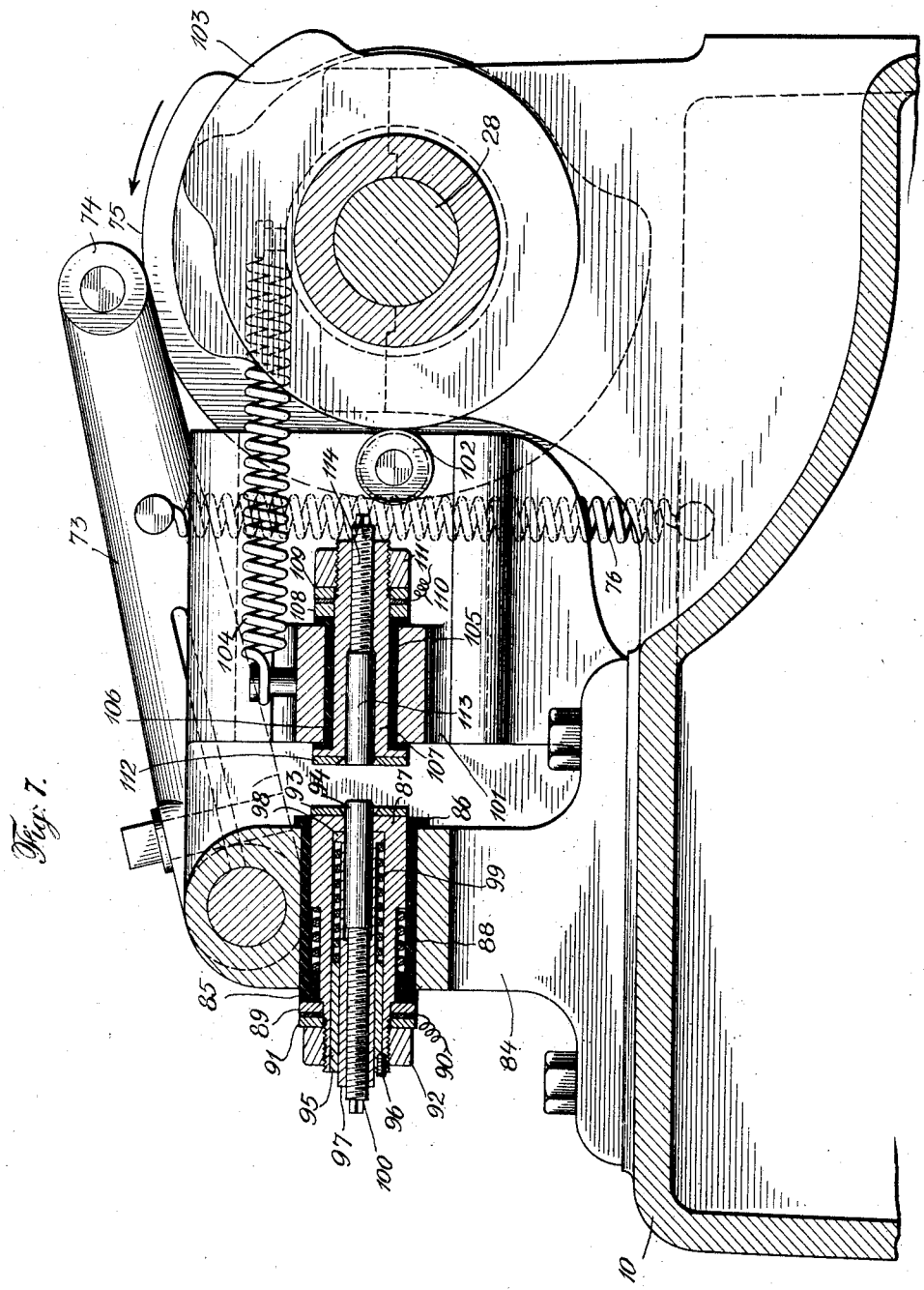
Figure 8:
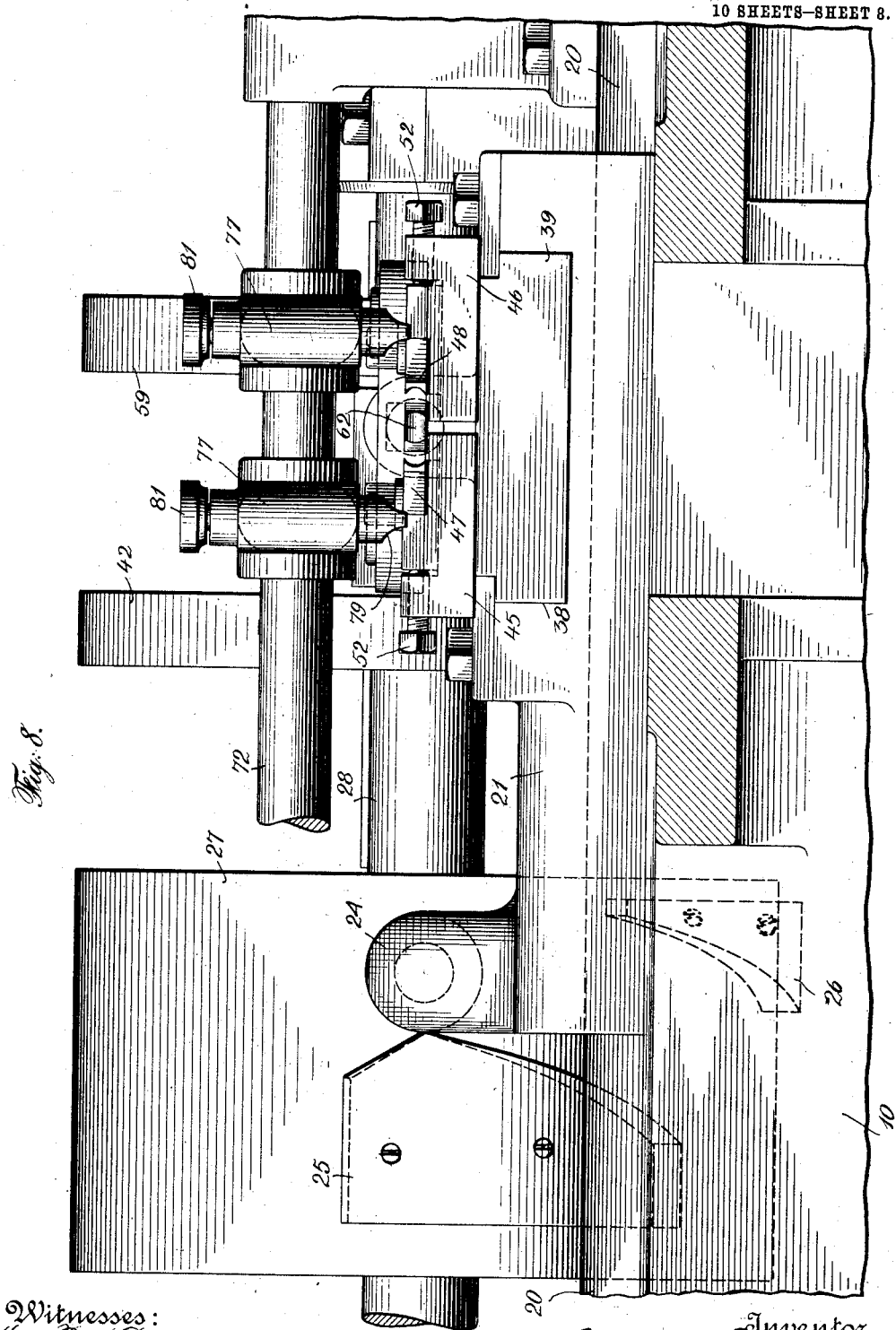
Figure 9:
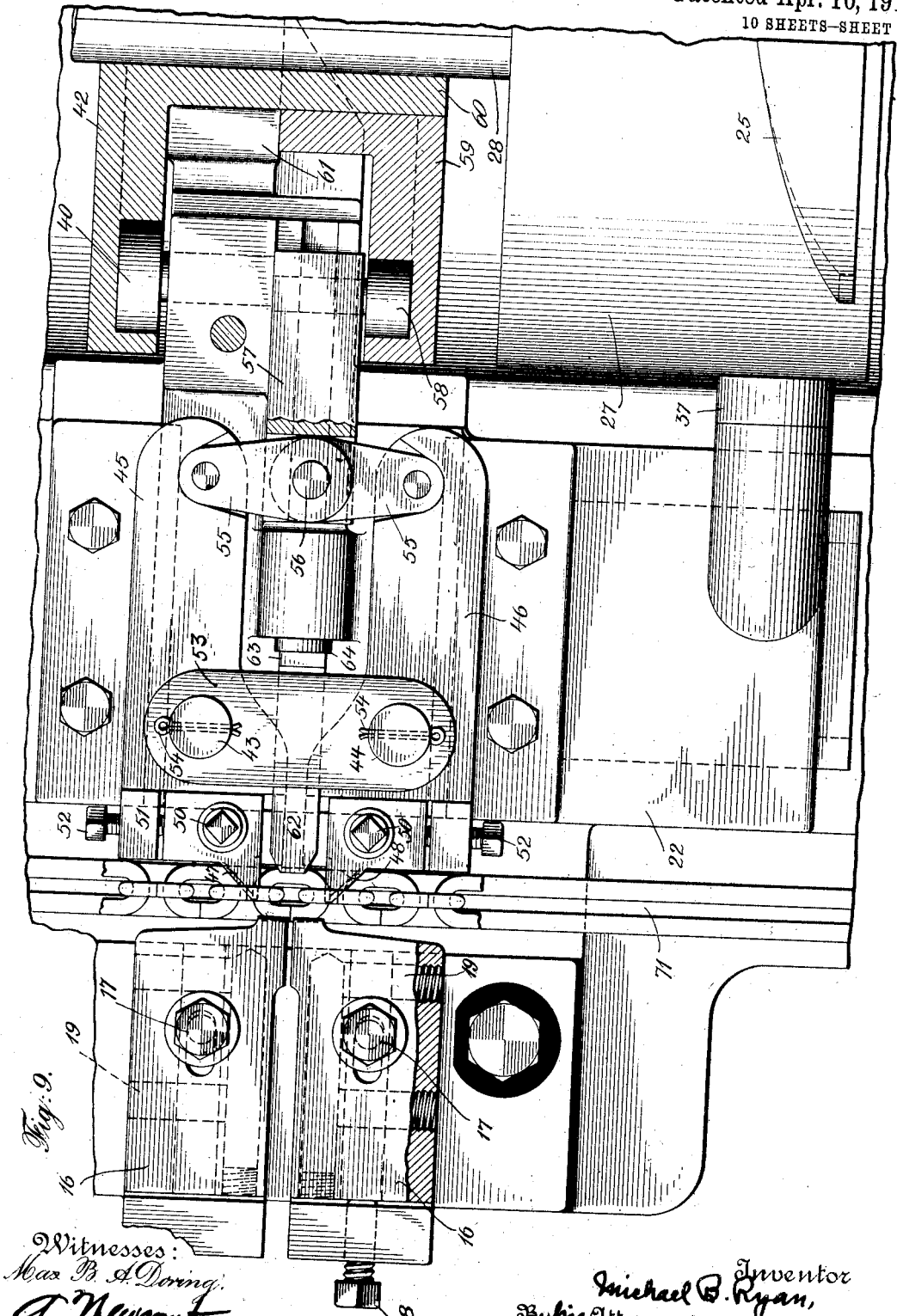

Figure 1 is a top plan view of a machine embodying my invention, the parts at the left hand side of the machine being shown in the position of having finished the return sidewise movement, the central jaw and the squeezing jaws being ready to move forward against the chain, and the parts at the right hand side being shown at the moment when the contact has just been broken, the central jaw about to be retracted, the squeezing jaws being thrown together and the clamps being raised in a way to permit the feeding movement; Fig. 2 is a front elevation; Fig. 3 is an elevation on an enlarged scale of the right hand end of the machine; Fig. 4 is a top plan view of the left hand welding mechanism; Fig. 5 is a cross sectional view on the line 5—5 of Fig. 4; Fig. 6 is a similar view on the line 6—6 of Fig. 4; Fig. 7 is a similar view on the line 7—7 of Fig. 1; Fig. 8 is a front elevation of the welding mechanism, showing the cam for moving one of the main slides; Fig. 9 is a top plan view of the right hand welding mechanism on an enlarged scale; Fig. 10 is a diagrammatic view of the circuits of the illustrated embodiment of my welding machine.

The object of my invention has been to provide a welding machine which is an improvement upon the machine that is the subject of an application for patent filed by me June 20, 1906, Serial #322,590, and which machine, while specially adapted for welding chain, also has features which are capable of use for other purposes. The machine of my said application has two sets of welding apparatus, and the chain is fed past both of said sets in once passing through the machine. The first set welds the joints, (which occur in the sides of the links) in those links which are presented to it horizontally. In passing from the first to the second welding apparatus, the chain is given a quarter turn about its axis, so that those links which were vertical in passing the first set of apparatus are horizontal in passing the second set, and are operated upon by said second set.

It is to be understood that the machine which is illustrated is but one of many possible embodiments of my invention, and that while it is chosen as the best embodiment of my invention known to me, it is only to be regarded as an illustration of the principles of my invention.

The machine which is illustrated in the drawings consists of a table 10 supported upon legs. Brackets 11 are formed on the table to support the secondaries of the transformers. The secondaries 12 are each fitted between a pair of said brackets, and are provided with lugs 12ᵃ that are adapted to rest upon and be bolted to the said brackets. The transformers, as usual, have laminated cores 13, the plates being held together by end frames 14, which are drawn together by bolts 15. There are the usual primary coils. This arrangement of the secondaries with lugs that are adapted to rest upon the table is a very convenient one, permitting the transformer to be readily attached to or removed from the machine without the dismantling of any other parts.

Upon the upper terminals of each secondary is mounted an electrode 16, the electrodes having plane under surfaces, the contacting surfaces of the terminals and electrodes being preferably scraped to make the most perfect fit possible. Each electrode is secured to its terminal by a bolt 17, the bolt passing through a slot in the electrode so as to permit the electrodes to be adjusted toward and from the work. For the purpose of effecting such adjustment a set screw 18 is threaded in the terminal and presses against the electrode. The electrodes are provided with passages 19 to permit a circulation of water through them for cooling; the arrangement of pipes for the water is not shown. There are thus two pairs of electrodes, a right and a left pair, on the machine.

To present the chain to the electrodes, and to feed the chain, various jaws and clamps are provided which will now be described. Upon the upper surface of the table a dovetailed guide-way 20 extends throughout the length of the table, parallel to its forward edge. Upon this guide-way are mounted right and left slides 21 and 22 respectively, upon which are mounted the jaws for the respective electrodes. The slide 21 has a boss 23 at its left end, upon which is journaled an anti-friction roller 24, by which the slide is reciprocated upon the guide 20. The roller 24 is engaged by cams 25 and 26 that are removably attached to the face of a drum 27, the drum being fast upon a shaft 28 that is journaled in bearings parallel to and at the rear side of the table. The shaft 28 carries a gear 29 that is driven by a pinion 30 on the driving shaft 31. The driving shaft has a belt pulley 32 that runs loose upon it, and that is engaged with the driving shaft by a clutch 33, the latter being operated by an arm 34 on a rock shaft 35 that carries a handle 36, by which it can be rocked. The cam 25 moves the slide 21 to the right, and the cam 26 moves it to the left. The amount of movement can be regulated by substituting cams of different width for the cams 25 and 26. The slide 22 is in all respects like the slide 21 except that the boss carrying its cam-engaging roller 37 is at the right end of the slide instead of the left. This arrangement permits the two welding apparatuses to be brought more closely together for convenient inspection. As the parts carried by the slides 21 and 22 are exactly alike and arranged in the same way, only the parts upon one of said slides will be described. The slides 21 and 22 are each provided with a guide-way 38 transverse to the guide-way 20, that is, extending front and back of the machine. In the guide-way 38 is mounted a cross slide 39, the latter having an anti-friction roller 40 that is engaged by a path cam 41 in a disk 42 so that by the rotation of the said disk the slide 39 is moved toward and from the electrodes. Two pins 43 and 44 are secured in the upper face of the slide 39, and levers 45 and 46 are pivoted upon the said pins. At their front ends the said levers have jaws 47 and 48 respectively for engaging the links of the chain as hereinafter described. The said jaws are preferably adjustable on the levers and removable from them, and for that purpose the jaws are, as shown in Fig. 6, provided with ribs 49 which engage slots in the upper surfaces of the levers, and each jaw is secured to its lever by a bolt 50 passing through a slot in the jaw. Each lever has a lug 51 formed thereon and an adjusting screw 52 threaded through said lug to bear against its respective jaw. The pins 43 and 44 are connected by a plate 53 having holes in which the said pins are received, and the plate is secured in place by cotter pins 54 passing through the said pins. The levers 45 and 46 are connected at their rear ends by toggle links 55, the central pin 56 of which links is, as shown in Fig. 9, mounted in a slide 57, the latter being mounted in a guide-way in the slide 39. The slide 57 carries an anti-friction roller 58 by which it is reciprocated, the said roller engaging a path cam in a disk 59. The disks 42 and 59 are connected together as by a sleeve 60 formed on the disk 42, upon which a hub of the disk 59 is secured.

In order that the disks and path cams may travel with the slide 39 throughout its movement, the sleeve 60 is splined upon the shaft 28, and the slide 38 is provided with an arm 61, Figs. 4, 6 and 9, which is recessed in its upper face to receive the sleeve 60, and which is of such width as to fit between the disk 42 and the hub of the disk 59. By this construction, whenever the slide 21 or the slide 22 is reciprocated along the guide-way 20, the arm 61 will cause the two disks to have a corresponding movement, so that the said disks are always in proper relation to the parts which their cams operate. It will be seen that the cam 41 causes the jaws 47 and 48 to approach and recede from the electrodes, and that the cam in the disk 59 causes the said jaws to be moved toward each other or to be separated.

For the purpose of forcing the link to be welded against the electrodes, a central jaw 62 (see especially Fig. 6) is mounted in a slot formed in the plate 53 so that it can reciprocate toward and from the electrodes. The rear end of the jaw 62 has a head 63 against which a plug 64 is forced by a spring 65, the plug and spring being mounted in a socket formed in a boss 66 on the slide 39. The forward movement of the jaw 62 is limited by the striking of its head 63 against the rear side of the plate 53. The chain is guided through the machine by resting upon plates 67, 68, 69 and 70 which are supported upon studs secured to the table, each of said plates, as shown in Fig. 6, having a plane upper surface upon which the horizontal links are supported, and having a groove 71 in which the vertical links are received.

The jaws 47 and 48 under the combined action of the slide 21 and the slide 39 have a four-way motion. They approach a link and squeeze it together, and then when the joint has been welded they feed the chain until the next link has been brought in position. Then the jaws release the link and are retracted, and finally they are moved to the original position ready to engage the new link.

In order to hold the chain while the jaws are letting go of one link and engaging the next link, I provide clamps of any suitable form. The clamps which I prefer to use are constructed as follows: A shaft 72 is mounted on brackets on the table, close and parallel to its front side. This shaft has a lever 73 fastened thereto, which lever is provided with an anti-friction roll 74. The said anti-friction roll rests upon and is operated by a cam 75 on the shaft 28, the roller being held against the cam by a spring 76. The clamping jaws are carried by arms 77 fast on the shaft 72, each having a socket 78 formed in its outer end. The cylindrical clamping jaws 79 are mounted in the said sockets and are provided with stems 80 whose outer ends are engaged by a thumb nut 81. A pin 82 on the stem engages a slot in the lever end to prevent the jaw from turning. A spring 83 surrounds the stem of the jaw in a socket and forces the said jaw downward. The degree of pressure can be regulated by the position of the thumb nut on the jaw stem. Each jaw is recessed at its sides so as to nearly fit between the vertical links, and to reach and bear upon the horizontal links. Each pair of electrodes has its own pair of clamping jaws operated by its own cam 75, so that the two sets of welding apparatus can operate at different times for purposes to be later described.

In order to turn the welding current off and on at the proper times, controllers are provided. The form of controller which I prefer to use is that illustrated in Fig. 7. A bracket 84 is secured upon the table, and a sleeve 85 of insulating material is secured in such bracket. The said sleeve preferably has a flange 86 at its rearward end to prevent its being forced forward in the bracket. Within the sleeve 86 is mounted a sleeve 87 of conductive material, a spring 88 being interposed between a shoulder formed on the exterior of the sleeve 87 and one formed on the interior of the sleeve 86 so that the sleeve 87 is yieldingly forced rearward. The rearward position of the sleeve 87 is controlled by the contact of a washer 89 which is mounted upon said sleeve to press against a shoulder formed thereon, and which also strikes upon the rear end of the sleeve 85. A wire 90 of the primary circuit of the transformer has a washer which is held against the washer 89 by a washer 91, the latter being forced home by a nut 92 secured on the sleeve 87. The sleeve 87 has its rear face armed with a disk 93, of German silver or other metal of good conductivity, and also has a carbon pencil 94 mounted in a centrally formed hole therein. A sleeve 95 is fastened as by a screw 96 in the forward end of a central bore in the sleeve 87, and a sleeve 97 is slidably mounted in the sleeve 95, the forward end of the sleeve 97 having a collar 98 that bears in a bore in the sleeve 87. A spring 99 is interposed between the sleeve 95 and the collar 98, and thus yieldingly tends to force the sleeve 97 rearward. A screw 100 is mounted in the sleeve 97 and bears against the rear end of the carbon pencil, the latter being received in a central bore in the rear end of the sleeve 97. By means of the screw 100, the pencil can be adjusted to project the desired amount beyond the face of the disk 93 for a purpose to be later described.

A slide 101 is mounted in a guide-way formed in a bracket on the table, and such slide carries an anti-friction roller 102 that bears against a cam 103 on the shaft 28. A spring 104 keeps the roller in contact with the cam. In the slide 101 is formed a bore 105 in line with the sleeve 86, and a sleeve 106 of insulating material is mounted in the said bore. Within the sleeve 106 is a sleeve 107 of conductive material, the sleeve having a flange at its forward end and having washers 108 and 109 at its rearward end corresponding to the washers 89 and 91. A wire 110 of the primary circuit of the transformer has a washer that is clamped between the washers 108 and 109. A nut 111 on the sleeve 107 serves to clamp the washers 108 and 109 together, and to draw a collar on the forward end of the sleeve 107 firmly against the sleeve 106. The face of the sleeve 107 is preferably provided with a disk 112, of German silver or similar metal. A carbon pencil 113 is mounted in a central bore in the sleeve 107, and a screw 114 is provided for adjustment of the said pencil.

In the operation of the circuit breaker, the pencil 94 is so adjusted as to project beyond the disk 93, so that when the cam forces the slide forward, the pencils will be the parts to first come in contact. Thus any sparking which comes from the breaking of the circuit will occur upon the pencils. After the carbons have come in contact, the German silver disks will be brought in contact and afford ample cross section to conduct the current without heating. The spring 99 will permit the pencil 94 to yield, and yet will keep it firmly against the opposing pencil. Likewise the spring 88 will permit the German silver disk 93 to yield, and yet will keep it firmly in contact with the opposing disk. When the circuit is to be broken, the slide will retreat, first separating the German silver disks; but as the pencils will still be in contact, no breaking of the circuit will occur, and the said disks will not be injured. After the said disks have been separated, the carbons will separate, and the sparking due to the breaking of the circuit will take place only on the carbons. Instead of a single cam 103 to operate the contact slide, I prefer, as illustrated in Fig. 7, to use two cams 103, so that by adjusting their positions relative to each other about the shaft, the length of the surface which acts upon the roller 102 may be varied, and the length of time during which the current is supplied be accordingly controlled.

In Fig. 10 the circuits of my machine are illustrated diagrammatically. In this figure the two secondaries 12 of the transformers are, as before stated, provided with their laminated cores 13. The current is received from the main 115 and flows around the primary coil 116, and thence by the lead 117 to the circuit breaker or controller. The slide of the left-hand controller is shown as operated by the engagement of a roller 118 on a bar 119 carried by the said slide with a path cam 120 in the face of a bevel gear 121. Similarly the right-hand controller is shown as operated by the engagement of a roller 122 on a bar 123 carried by the slide of such controller with a path cam 124 in the face of a bevel gear 125. The two bevel gears are shown as driven simultaneously by means of bevel pinions 126 and 127 on a shaft 128. In the machine, as actually constructed, the path cams would be perpendicular to the plane of the paper in Fig. 10, but in order to illustrate the entire movement in a single figure, I have shown the path cams as formed on the faces of bevel gears, because in this manner they can be illustrated as in the plane of the paper. The main 115 is also connected to the right-hand primary 129, the opposite end of which primary is connected by a lead 130 with the controller. The movable members of both controllers are connected with a main 131. The path cams 120 and 124 are so formed that the welders start at different times, and that one welder is not entirely cut off before the other welder is started, for reasons to be later described.

In the operation of the above illustrated embodiment of my invention, the chain is led through the machine until the first horizontal link is opposite the first pair of electrodes. The parts will be assumed to be in the position illustrated in Fig. 4, in which the jaws 47 and 48 are retracted and separated, and the central jaw 62 is likewise retracted, the slide 39 being at the rear end of its travel. The machine being set in motion, the slide 39 will be moved toward the electrodes carrying the still separated jaws 47 and 48 opposite the ends of the central horizontal link and projecting them through the vertical links. The toggle at this time is bent, as illustrated in Fig. 4. As the slide 39 moves toward the electrodes, the central jaw 62 will be yieldingly forced against the link, pressing the latter firmly against the faces of the electrodes. At this instant the clamps rise out of contact with the chain, the link having been firmly seated by the central jaw, and the slide 57 is forced forward straightening the toggle and causing the jaws 47 and 48 to approach each other and get a firm hold of the link. The parts are now in the position illustrated in Fig. 9. The circuit is then completed by the controller of Fig. 7, and maintained until the link has been properly heated, after which the jaws 47 and 48 squeeze the weld together, and the current is broken. The jaws 47 and 48 then retract sufficiently to withdraw the link from contact with the electrodes, and while still holding the link squeezed together move in the feeding direction until the next horizontal link is brought in front of the electrodes. Thus during the feeding movement the link is held compressed, and has ample time to set before it is released from the jaws. At the end of the feeding movement the clamps descend and hold the chain while the jaws are retracted and moved back to the position of Fig. 4.

The cams are so positioned that the welders start at different times. This is both desirable and economical. It is desirable at the start of the welding operation that the current be weaker, because the current thus has time to heat the link more gradually, and a softer and better weld is obtained than if the link is heated suddenly. As one welder is already in operation when another welder is started, the current is divided between the two, and thus the starting welder gets a current of reduced quantity. By this arrangement also the machine need only be supplied with half the current which it would need if the welders operated simultaneously.

The above illustrated machine has among others the following advantages: It is a machine of great simplicity. The electrodes are stationary, and the only moving parts which engage the chain are the jaws or clamps. These jaws not only squeeze the link during the welding operation, but feed the chain. The simplicity permits a high speed. As before stated, the welders start at different times thus automatically regulating the current for each other in a most desirable way, and permitting a current of lesser quantity to be used than if they operated simultaneously. The main slides being made right and left permit the electrodes to be brought close together so that both sets can be easily watched by the same person. The machine can be adjusted for different sized chain by simply adjusting the jaws on their levers, changing the cam plates which operate the main slides and adjusting the clamps on their shafts. The machine can be started to work upon the first link of the chain, and will weld every link of the chain to the last link thereof. The chain can easily be removed from the machine or from either welder without drawing the entire chain through the machine, and it can as easily be replaced. As the feeding occurs while the welded link is cooling, a high speed is made possible.

I claim:

1. In a chain welding machine, the combination of two sets of stationary electrodes, two sets of means for presenting chain links to said stationary electrodes, and means for starting the welding operation by the electrodes successively after links have been presented thereto by the presenting means.

2. In a chain welding machine, the combination of two sets of welding devices including stationary electrodes, means for forcing links against said electrodes, means for starting one set to weld, means for starting the second set to weld before the first set has completed its operation, the first set being caused to complete the welding operation before the second set.

3. In a chain welding machine, the combination of two sets of stationary electrodes, two devices for forcing links of a chain against the respective electrodes, means for operating said two devices, and for turning on the current, first on one set of electrodes and then on the other, the current being maintained upon the first set until it is turned on upon the second set.

4. In a chain welding machine, the combination of electrodes, jaws for squeezing a link, and means for both moving said jaws toward and from said electrodes and for moving them in the direction of feed.

5. In a chain welding machine, the combination of electrodes, link-engaging jaws, means for advancing said jaws to engage a link, and means for moving said jaws to feed said link.

6. In a chain welding machine, the combination of electrodes, a pair of jaws, means for advancing said jaws to engage a link, for squeezing said jaws together during the welding operation, and for retracting said jaws from the electrodes while still squeezing the link, and means for moving said jaws to feed the link while still squeezing the same.

7. In a chain welding machine, the combination of two pairs of electrodes, two pairs of jaws, and means for causing each of said pairs of jaws to engage a link and then to feed it, said pairs of jaws performing the said operation at different times.

8. In a chain welding machine, the combination of two pairs of electrodes, two pairs of link-engaging jaws, means for causing said jaws to engage a link, to squeeze it and then to feed it, and chain guides permitting the chain to be turned in passing from one to the other of said pairs of electrodes.

9. In a chain welding machine, the combination of a pair of electrodes, a pair of link-engaging jaws, means for causing said jaws to engage a link and then feed it, and clamps adapted to engage the chain while the jaws are releasing one link and engaging the next one.

10. In a chain welding machine, the combination of two pairs of electrodes, two pairs of link-engaging jaws, means for causing the said jaws to engage a link and then to feed it, two pairs of clamps, each of said pairs of clamps being adapted to hold the chain while not engaged by the corresponding pair of jaws, and chain guides permitting the chain to turn upon its axis in passing from one to the other of said pairs of electrodes.

11. In a chain welding machine, the combination of stationary electrodes, jaws adapted to be advanced and retracted from said electrodes and to be squeezed together, and a central jaw between said first-mentioned jaws, adapted to be advanced and retracted toward and from said electrodes to force a link against the latter.

12. In a chain welding machine, the combination of stationary electrodes, jaws adapted to be advanced and retracted from said electrodes and to be squeezed together, and a central jaw between said first-mentioned jaws, adapted to be yieldingly advanced and retracted toward and from said electrodes to force a link against the latter.

13. In a chain welding machine, the combination of stationary electrodes, a main slide movable parallel to the face of said electrodes, a cross slide mounted upon said main slide, jaws pivoted upon said cross slide, and means for operating said cross slide and for opening and closing said jaws.

14. In a chain welding machine, the combination of a pair of stationary electrodes, a main slide movable parallel to the face of said electrodes, a cross slide mounted upon said main slide, levers pivoted upon said cross slide, jaws adjustably attached to said levers, and removable cams operating said main slide.

15. In a chain welding machine, the combination of a pair of stationary electrodes, a main slide movable parallel to the face of said electrodes, a cross slide mounted upon said main slide, levers pivoted upon said cross slide, jaws adjustably attached to said levers, removable cams operating said main slide, and chain-holding clamps that are adjustable parallel to the face of said electrodes.

16. In a chain welding machine, the combination of stationary electrodes, a main slide movable parallel to the face of said electrodes, a cross slide mounted on said main slide, levers pivoted on said cross slide, jaws on said levers, toggle links connecting said levers, a slide connected with the central pin of said links, and a cam for operating said slide.

17. In a chain welding machine, the combination of stationary electrodes, a main slide movable parallel to the face of said electrodes, a cross slide mounted on said main slide, jaws pivoted on said cross slide, a central jaw yieldingly mounted on said cross slide, and means for operating said slides and jaws.

18. In an automatic chain machine, the combination of stationary electrodes, link holding devices, means for bringing said link holding devices into operative relation with the stationary electrodes, and chain guides consisting only of parts which engage the under sides of the chain, the said link holding devices at one period in the operation of the machine being withdrawn from over the chain, whereby the chain may be lifted from the machine without dismantling any parts of said guides.

19. In an automatic chain machine, the combination of electrodes, jaws for engaging a link and forcing it against said electrodes and for feeding the chain, and means for giving said jaws said movements, whereby said machine is adapted to weld the first link of a chain and to automatically continue the operation of welding links of the chain.

20. In an automatic chain machine, the combination of electrodes, two sets of jaws for engaging links and forcing their respective links against the corresponding electrodes, and for feeding the chain, and means for giving said jaws said movements.

In testimony that I claim the foregoing I have hereunto set my hand.

MICHAEL B. RYAN.

Witnesses:
CHAS. L. GRAVES,
EDWARD G. CONGER.

Copies of this patent may be obtained for five cents each, by addressing the "Commissioner of Patents, Washington, D. C."